United States Patent [19]

Bennett et al.

[11] Patent Number: 4,650,535

[45] Date of Patent: Mar. 17, 1987

[54] APPARATUS FOR HEAT-SEALING THERMOPLASTIC SHEETING

[75] Inventors: Charles J. Bennett; Terry F. Hinson, both of Oakboro, N.C.

[73] Assignee: Creative Packaging Machinery, Inc., Oakboro, N.C.

[21] Appl. No.: 765,271

[22] Filed: Aug. 13, 1985

[51] Int. Cl.⁴ .................. B30B 15/22; B30B 15/34
[52] U.S. Cl. .................... 156/352; 53/373; 100/93 P; 156/358; 156/365; 156/583.1; 156/583.2; 156/583.9; 156/583.91; 493/189; 493/207; 493/209
[58] Field of Search .................. 156/515, 583.1, 583.2, 156/583.8, 583.9, 583.91, 352, 358, 365; 493/189, 193, 194, 203, 207, 209; 53/373; 100/93 P

[56] References Cited

U.S. PATENT DOCUMENTS

| | | | |
|---|---|---|---|
| 3,450,587 | 6/1969 | Beason et al. | 156/515 |
| 3,490,981 | 1/1970 | Shanklin | 53/373 |
| 3,909,334 | 9/1975 | Verbeke | 156/583.3 |
| 4,447,284 | 5/1984 | Shanklin et al. | 156/583.1 |

Primary Examiner—Michael Wityshyn
Attorney, Agent, or Firm—Shefte, Pinckney & Sawyer

[57] ABSTRACT

An improved L-sealing apparatus providing an L-shaped sealing bed assembly mounted at its ends and corner on three piston-and-cylinder assemblies operable upon closing of the sealing arm into adjacency with the sealing bed assembly to translatorily move the sealing bed assembly into uniform and continuous surface contact and pressure with the heating wire arrangement of the sealing arm. In another embodiment, the sealing bed assembly is fixed to the machine frame and a pair of pneumatic-electromagnetic latching assemblies are provided to magnetically engage the sealing arm at its opposite ends in its sealing disposition adjacent the sealing bed assembly to torsionally distort the sealing arm if and as necessary to bring its wire heating assemblies into parallel continuous and uniform surface contact and pressure with the sealing bed assembly.

23 Claims, 11 Drawing Figures

APPARATUS FOR HEAT-SEALING THERMOPLASTIC SHEETING

BACKGROUND OF THE INVENTION

The present invention relates to apparatus for heat sealing thermoplastic sheeting and, more particularly, to such apparatus of the so-called L-sealer type adapted for use in packaging articles in heat-shrinkable plastic film.

In recent years, it has been increasingly popular and commonplace to package many commercial articles in close-fitting transparent plastic film. This packaging is accomplished conventionally by wrapping the article to be packaged loosely in a heat shrinkable plastic film, sealing together the abutting edges of the film to enclose the article, and subjecting the package to sufficient heat to activate shrinkage of the film tightly about the article.

Machines commonly referred to as L-sealers are available for commercially accomplishing the preliminary wrapping procedure as above-described. Heat shrinkable plastic film in continuous sheets pre-folded along a central longitudinal edge and packaged in convenient rolled form is utilized for this purpose. L-sealing machines characteristically provide a sealing table for supporting the plastic film with the article inserted between the folds of the film and a pair of L-shaped jaws at the table adapted for receiving and grippingly engaging the film therebetween. One of the jaws is provided with a heated wire sealing arrangement to simultaneously sever and seal the film along a continuous L-shaped seal line extending parallel to the folded edge of the film and transversely between the parallel seal extent and the folded edge. In continuous operation, the transverse seal formed in making each package provides the initial transverse seal for the next package so that each described L-sealing operation provides complete package formation. Representative examples of L-sealing equipment of the described type are found in U.S. Pat. Nos. 3,347,729; 3,490,981; Re. 30,010 and 4,035,983. A more sophisticated L-sealing apparatus adapted for automatic high speed operation is disclosed in U.S. Pat. No. 4,219,988.

As will be appreciated, it is extremely important in the described L-sealing operation that a strong seal be formed uniformly and continuously along the L-seal line in order to insure proper shrinkage of the film about the package. The satisfactory accomplishment of this purpose has been an ongoing problem in the L-sealing industry for many years. Virtually all L-sealers utilize as one jaw a sealing bed fixed to the machine frame at the sealing table surface and as the other jaw a moveable sealing arm pivoted to the frame and carrying the heated L-seal wires. Formation of the L-seal is a function of two basic criteria: (1) the proper alignment of the sealing bed and the sealing arm with one another, and (2) the exertion of uniform sealing pressure along the entire L-seal line when the sealing bed and arm are closed together for sealing operation.

To facilitate proper alignment of the sealing bed and arm, substantially all L-sealers provide adjustable mounting of the pivots for the sealing arm and adjustable support bolts for the sealing bed to permit the selective adjustment of their relative positions with respect to the machine frame to achieve proper desired alignment. However, it is common for the sealing bed and sealing arm to become misaligned during use and therefore realigning adjustment is constantly required. Alignment using the described adjustments is time-consuming, tedious and expensive, both in terms of labor and machine downtime, and accordingly is widely viewed as perhaps the greatest disadvantage of conventional L-sealing machines.

Furthermore, even with a properly aligned sealing bed and sealing arm, problems may still be encountered in conventional L-sealers in obtaining properly uniform surface contact and pressure between the sealing bed and arm along the entire extent of the L-seal line. Some L-seal apparatus are adapted for manual movement of the sealing arm into engagement with the sealing bed, whereby the achievement of uniform sealing contact and pressure depends greatly upon the skill and consistency of the operator. More often, L-sealing apparatus is provided with a mechanical or pneumatic latching or similar arrangement to exert force on the sealing arm to press it into engagement with the sealing bed. Some apparatus of this type experience problems with the warping or deformation of the sealing arm which prevents uniform contact between the sealing arm and bed even when they are initially properly aligned. Typically, this problem is solve by constructing the sealing arm to be sufficiently rigid and sturdy to avoid such distortion. In the above-identified U.S. Pat. No. 3,490,981; Re. 30,010; and 4,035,983, L-sealing equipment is provided with an L-shaped arm pivoted at its free ends to the frame about co-linear pivot axes with a latching arrangement being provided at the corner of the arm, in order to avoid misaligning distortion of the sealing arm when the latching mechanism is activated.

L-sealers, because of the exposed heating wires and the significant pressures exerted between the sealing arm and bed, also require the use of safety mechanisms to avoid accidental injury to the operator or damage to the machine or articles to be packaged resulting from closing of the sealing arm and bed onto the operator or another obstruction. Typically, such safety mechanisms, although effective for their intended purposes, have been unnecessarily complicated and sophisticated and hence additionally serve to increase the cost of manufacture as well as the cost and frequency of repair and maintenance.

In contrast, the present invention provides an improved L-sealer uniquely adapted to automatically provide substantially continuous and uniform surface contact and pressure along the entire L-seal line substantially regardless of any misalignment of the sealing arm and bed and without requiring fine adjustment thereof. The present invention also provides a simple and effective safety mechanism for de-actuating operation of the apparatus when an obstruction is encountered by the sealing arm.

SUMMARY OF THE INVENTION

Briefly described in its broadest aspect, the present apparatus is adapted for heat sealing substantially any thermoplastic sheeting material and basically includes a frame, a clamping jaw and a heating jaw, with the jaws being mounted on the frame for relative movement thereof with respect to one another between a spaced-apart disposition and an adjacent disposition for gripping and heat sealing thermoplastic sheeting therebetween. An arrangement is provided for maintaining one of the jaws to be substantially fixed in the adjacent disposition of the jaws and another arrangement is provided for moving the other jaw at plural spaced locations thereon for translatory movement in the adjacent disposition automatically to orient and to engage the other jaw in substantially continuous surface contact with the fixed jaw for uniformly applying sealing heat to thermoplastic sheeting gripped between the jaws.

In the preferred embodiment of the present invention, the heat sealing apparatus is constructed as an L-sealer for heat-sealing folded thermoplastic film along an L-seal line. The frame is provided with a sealing table surface, the clamping jaw having an L-shaped sealing bed surface and an arrangement being provided for mounting the clamping jaw on the frame with the sealing bed surface generally adjacent the sealing table surface. The heating jaw is provided with an L-shaped heating arrangement thereon and an arrangement is provided for pivotally mounting the heating jaw on the frame for pivotal movement between the spaced-apart disposition, wherein thermoplastic film to be heat sealed is placed on the table surface and the sealing bed surface, and the adjacent disposition, wherein the sealing bed surface and the heating arrangement of the respective jaws are in facing relation for gripping and heat sealing the thermoplastic film therebetween.

In one embodiment, an arrangement is provided for latching the heating jaw to be substantially fixed in its adjacent disposition. The arrangement for mounting the clamping jaw includes an arrangement for biasing the clamping jaw at the spaced locations of each of the ends of the corner of its L-shaped sealing bed surface for producing the aforesaid translatory movement of the clamping jaw toward the heating jaw in its adjacent disposition automatically to orient and engage the sealing bed surface in parallelism and substantially continuous and uniform surface contact with the heating arrangement along substantially their entire L-shaped extent. In this manner, the heating means is uniformly applied to the thermoplastic film gripped between the clamping and heating jaws.

Preferably, the biasing arrangement includes a plurality of linear actuators, such as compressed air operated piston-and-cylinder assemblies, mounted on the frame with the clamping jaw being mounted at its spaced end and corner locations respectively on the reciprocable pistons or other reciprocable members of the linear actuators. A source of compressed air is provided along with a conduit network for supplying the compressed air to the piston-and-cylinder assemblies. A pressure regulator or the like is provided in the conduit network for regulating the compressed air at a predetermined uniform pressure value to cause the linear actuators to exert generally the same biasing force on the clamping jaw at each spaced location for exerting uniform sealing pressure against the heating jaw. The latching arrangement for the heating jaw includes an electromagnet arrangement mounted on the frame and an armature arrangement on the heating jaw for magnetic latching contact with the electromagnet in the adjacent disposition of the heating jaw.

In another embodiment, an arrangement is provided for engaging the heating jaw at spaced locations thereon in its adjacent disposition and for moving the heating jaw toward the clamping jaw in translatory movement. The heating jaw is resiliently deformable by manipulation at the spaced locations and the engaging and moving arrangement is adapted for deforming the heating jaw to such an extent necessary to automatically orient and engage the heating arrangement in substantially continuous and uniform surface contact with the sealing bed surface for uniformly applying the heating arrangement to thermoplastic film gripped between the jaws.

Preferably, the heating jaw is generally rectangular in shape and is pivotably affixed to the frame along one rectangular side, the heating arrangement extending along the opposite rectangular side and one adjacent side. The engaging and moving arrangement is adapted to engage the ends of the free opposite side of the heating jaw in its adjacent disposition to resiliently deform the rectangular shape of the heating jaw to align the heating arrangement at the opposite and adjacent sides of the heating jaw into parallelism with the corresponding L-shaped extent of the sealing bed surface. The engaging and moving arrangement includes a plurality of linear actuators, preferably compressed air operated piston-and-cylinder assemblies, mounted on the frame for latching engagement of their reciprocable pistons with the heating jaw at the ends of its free opposite side. An electromagnet is mounted on the reciprocable piston of each linear actuator and an armature is mounted on the heating jaw at the ends of its opposite side for magnetic latching contact with the electromagnets in the adjacent disposition of the heating jaw. The linear actuators are arranged to exert generally the same force on the heating jaw at each location for exerting uniform sealing pressure against the clamping jaw.

According to another feature of the present invention, an actuator is provided for actuating movement of the heating jaw between its spaced-apart and adjacent dispositions and an arrangement is provided for de-actuating the actuator when the heating jaw encounters an obstruction during the movement into its adjacent disposition for engagement with the clamping jaw. The actuator is preferably coupled to a plate pivotably mounted on the frame to extend beneath the heating jaw to support the heating jaw restingly on the plate for pivotal movement of the heating jaw in following relation to pivotal movement of the plate. The de-actuating arrangement includes a switch mounted on either the plate or the heating jaw for switch-closing engagement by the other thereof while the heating jaw is in following relation with the plate for permitting jaw-closing operation of the actuator and for opening of the switch when the heating jaw and the plate are separated from one another, such as would occur upon the heating jaw encountering an obstacle, to stop jaw-closing operation of the actuator.

DESCRIPTION OF THE PREFERRED EMBODIMENT

Figure 1:
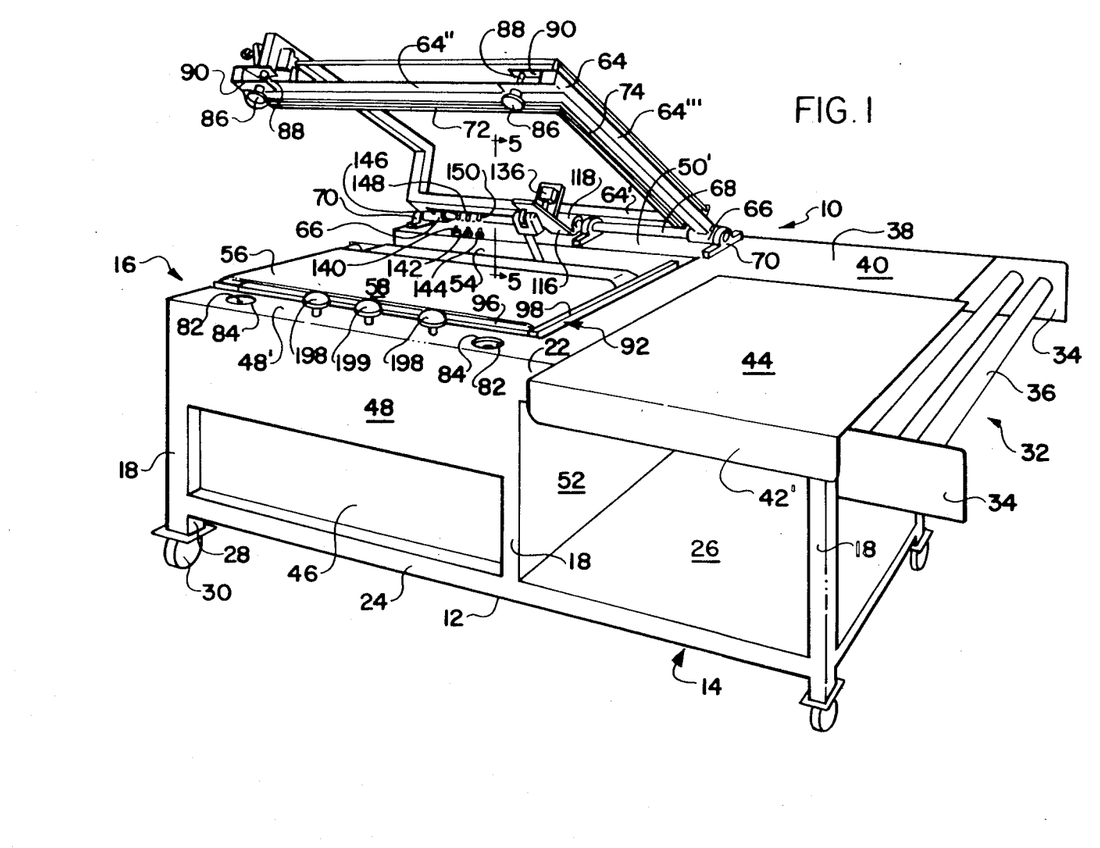
FIG. 1 is an overall perspective view of an L-sealing apparatus according to one preferred embodiment of the present invention.

Referring now to the accompanying drawings, and initially to FIG. 1, a preferred embodiment of the L-sealing apparatus of the present invention is indicated generally at 10. The L-sealer 10 includes a frame 12 having a table-like section 14 at one end thereof forming a packaging area and a cabinet-like section 16 at the other end thereof for housing and supporting the sealing components to form a sealing area. The frame 12 has a skeletal welded tubular framework of upright front and rear stanchions 18,20 and horizontal top and bottom cross members 22,24 extending therebetween. A bottom panel 26 is mounted on the frame 12 along its entire length. The four corners stanchions 18, 20 include support feet 28 which are supported on casters 30 for ease of movement of the L-sealer 10.

A film supporting and dispensing mechanism 32 is mounted to the frame 12 at the end of the packaging table section 14 for storing plastic film and feeding it along the top of the frame 12 in line to the package area and then to the sealing area. The film supporting and dispensing mechanism 32 is formed by a pair of upright support plates 34 mounted to the end stanchions of the packaging table section 14 of the frame 12 to extend outwardly therefrom adjacent the top surface of the packaging table section 14 and by a pair of cylindrical rollers 36 rotatably supported in horizontal side-by-side relation between the plates 34. The rollers 36 are thus adapted to rotatably support therebetween a conventional roll (not shown) of center-folded heat-shrinkable thermoplastic film, or another suitable heat-sealable plastic sheeting, for rotational off-winding of the film.

The packaging table section 14 of the frame 12 has a horizontal planar top panel 38 mounted on the top cross members 22 of the frame 12 to form a table surface 40. Another planar panel 42 having a downward flange member 42' is mounted by the flange member 42' to the front cross member 22 of the frame 12 with the panel 42 extending rearwardly across the top panel 38 in parallel relation therewith at a slight spacing thereabove sufficient to permit passage of one folded web of the film between the panels 38,42 while the other folded web of the film is passed over the top surface of the panel 42, whereby the panel 42 forms a packaging table surface 44. The packaging table section 14 of the frame 12 is open between the bottom and top panels 26,38 and does not include any side wall panels to provide an open area which may be utilized for storage of film rolls or the like.

The cabinet section 16 of the frame includes a boxlike lower enclosure 46 mounted on the bottom panel 26 for containing most of the electrical components of the apparatus hereinafter described. The remainder of the cabinet section 16 is generally enclosed at the front, rear and central sides thereof by upright front, rear and end wall panels 48,50,52, respectively, with the front and rear panels 48,50 including marginal top flange portions 48',50', respectively extending horizontally toward one another coplanarly with the top panel 38 of the packaging table section 14, to define an open-top channel area 54 within the cabinet section 16 above the boxlike enclosure 46 for housing a sealing conveyor table 56. The conveyor table 56 is of a conventional construction having a motor-driven endless conveyor belt 58 having a horizontal top run arranged to extend generally coplanarly with and to move endwardly away from the packaging table section 14. A pair of channel members 60 are mounted on transverse cross members of the frame 12 to extend lengthwise of the frame in facing relation to one another at the bottom of the channel area 54 to support the conveyor table 56 and permit easy sliding installation and removal thereof from the cabinet section 16 to permit access to the conveyor table 56 and to the interior working components of the apparatus 10 for maintenance and repairs.

Figure 2:
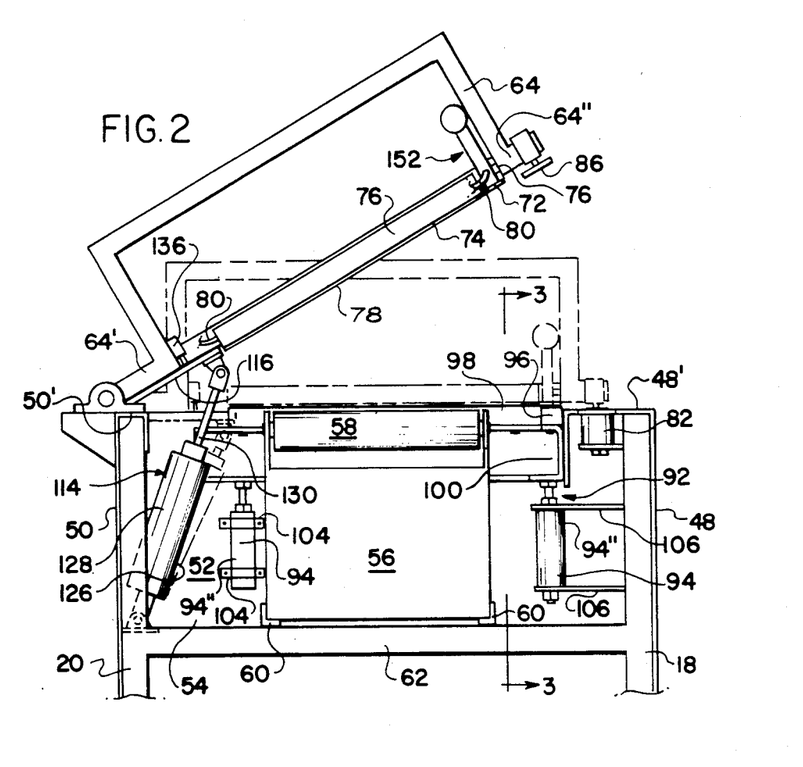
FIG. 2 is a left end elevational view of the L-sealing apparatus of FIG. 1.

A sealing arm assembly 64 formed of square tubing welded in a generally rectangular configuration is fixed by sleeve portions 66 at one longitudinal side of the arm 64 on a pivot shaft 68 which is rotatably supported horizontally in several bearings 70 mounted at spacings along the rear marginal flange portion 50' and on the adjacent end of the top panel 38 of the table section 14. In this manner, the sealing arm 64 is pivotably moveable upwardly and downwardly relative to the frame 12 between an upward position spaced-apart from the frame 12, as shown in full lines in FIG. 2, and a downward disposition adjacent the frame 12, as shown in broken lines in FIG. 2. The free outward side 64" of the sealing arm 64 opposite the pivoted side 64' and the adjacent transverse side 64''' of the arm 64 extending transversely therebetween at the center of the frame 12 have respective conventional impulse-type wire heating assemblies 72,74 attached to the inward surfaces of such sides 64",64''' in juxtaposed end-to-end abutment at the common corner of the sealing arm 64 and with the wire heating assemblies 72,74 projecting slightly beyond the downwardly facing surface of the sides 64",64''' to provide an L-shaped heat sealing arrangement on the sealing arm 64. Essentially, each wire heating assembly 72,74 includes a bed pad 76 along the lower surface of which a resistance-heated metal wire 78 is trained tautly, with the respective wires 78 of the heating assembly 72,74 crossing at the adjacent juxtaposed ends of the assemblies 72,74. The wires 78 are electrically heated from a central power supply circuit (FIG. 7) conveyed to the wires 78 through electrical leads 80, as more fully explained hereinafter.

A pair of electromagnets 82 are mounted to opposite ends of the front wall 48 of the cabinet section 16 of the frame 12 and are exposed upwardly through openings 84 at the opposite ends of the front marginal flange portion 48'. A pair of metal armature disks 86 are respectively affixed at the lower ends of a pair of armature shafts 88 mounted in brackets 90 at the opposite ends of the free outward side 64" of the sealing arm 64 for latching engagement of the sealing arm 64 by the electromagnets 82 in the disposition of the arm 64 adjacent the frame 12 for holding the arm 64 essentially rigid and fixed in such position.

An L-shaped sealing bed assembly 92 is supported along the front marginal flange portion 48' and along the inward surface of the end wall 52 of the channel area 54 by three frame-mounted piston-and-cylinder assemblies 94 at the opposite ends and the corner of the sealing bed assembly 92 to position it immediately adjacently beneath the wire heating assemblies 72,74 of the sealing arm 64 when it is in its downward position adjacent the frame 12. The piston-and-cylinder assemblies 94 are of the conventional type having a clyindrical housing 102 from one axial end of which extends a reciprocable piston rod 108 and adapted by fittings 110,112 at each end of the cylinder housing 102 for so-called double-acting operation by compressed air. Of course, as will be understood, any other type of conventional linear actuator having a reciprocable member, such as hydraulically-operated piston-and-cylinder assemblies, may also be employed. The sealing bed assembly 92 includes two linear seal pad sections 96,98 covered with a heat resistant material and mounted in juxtaposed L-shaped end-to-end relation on the top surface of an L-shaped support member 100 welded from conventional metal channel stock of C-shaped cross-section. The cylindrical housings 102 of two of the piston-and-cylinder assemblies 94 are bolted by brackets 104 to the inward end wall 52 at the front and back sides of the channel area 54 and the cylindrical housing 102 of the third piston-and-cylinder assembly 94 is bolted to extension plates 106 mounted to the inner surface of the front wall panel 48 of the cabinet section 16 at the outward end of the channel area 54. The piston-and-cylinder assemblies 94 are disposed in an essentially vertical orientation with their reciprocal piston rods 108 extending upwardly, the piston rod 108 of the piston and cylinder assembly 94' being affixed to the bottom surface of the support member 100 at the corner thereof and the piston rods 108 of the piston-and-cylinder assemblies 94" being affixed to the bottom surface of the support member 100 respectively at the opposite free ends thereof. As will thus be understood and as is hereinafter more fully explained, the sealing bed assembly 92 is thusly adapted to assume varied orientations with respect to the frame 12 and to the sealing arm 64 by the varied extension of the piston rods 108 of the piston-and-cylinder assemblies 94.

Figure 5A:
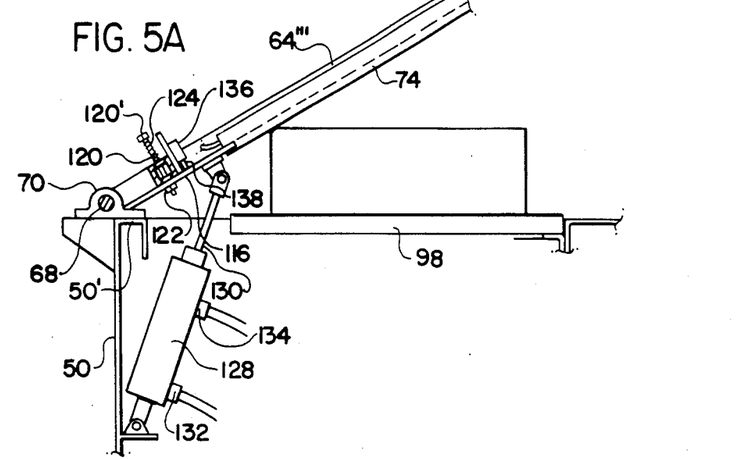
FIGS. 5A and 5B are vertical cross-sectional views taken along line 5—5 of FIG. 1 showing the sealing arm actuating arrangement.
Figure 5B:
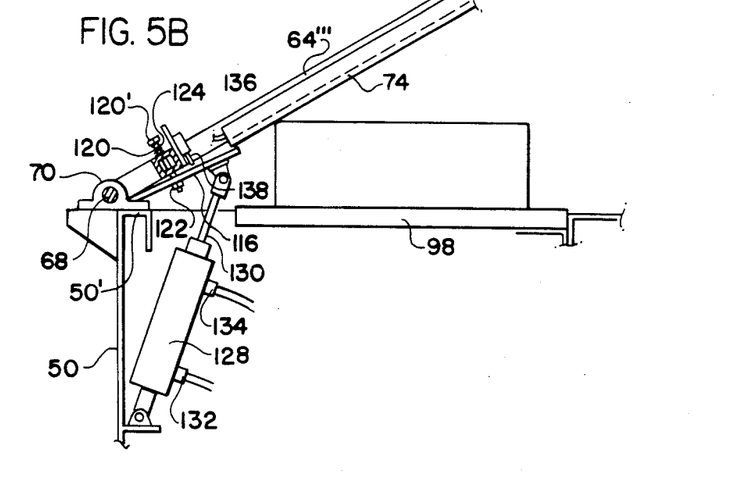

As best seen in FIG. 5, a drive arrangement, generally indicated at 114, is provided for powered actuation of the upward and downward pivoting movement of the sealing arm 64. The drive arrangement 114 includes a plate member 116 having a sleeve portion 118 at one end thereof by which the plate member 114 is pivotably mounted on the shaft 68 co-axially with the sealing arm 64. The plate 116 extends inwardly of the frame 12 toward the channel area 54 beneath the pivoted side 64' of the sealing arm 64, whereby the arm 64 rests by gravity on the top surface of the plate 116. A pair of elongated bolts 120 are affixed to the plate 116 by nuts 122 and extend slidably upwardly through the pivoted side 64' of the sealing arm 64 with coil springs 124 positioned about the upwardly exposed elongated extent of the bolts 120 between their heads 120' and the pivoted side 64' of the arm 64 to bias the arm 64 into resting engagement on the plate 116 and to limit the degree of available separation of the sealing arm 64 from the plate 116. Another piston-and-cylinder assembly 126 has its cylindrical housing 128 pivotably mounted to the rear wall 50 of the cabinet section 16 of the frame 12 within the channel area 54 centrally thereof, with the reciprocable piston rod 130 extending upwardly and being pivotably affixed to the bottom of the plate 116. The piston-and-cylinder assembly 126 is also of the conventional above-described construction adapted for double-acting compressed air operation through end fittings 132,134 in a double-acting manner, although other suitable linear actuators may be employed. As will thus be understood, as the piston-and-cylinder assembly 126 is operated to withdraw the piston rod 130, downward pivoting movement of the plate 116 is actuated, the sealing arm 64 pivoting downwardly in following relation therewith under the primary effect of gravity with the aid of the biasing springs 124, and similarly, as the piston-and-cylinder assembly 126 is operated to extend the piston rod 130, upward pivoting movement of the plate 116 is actuated to push the sealing arm 64 upwardly also.

A microswitch 136 is affixed to the front surface of the pivoted side 64' of the sealing arm 64 immediately above the plate 116 with the operating button 138 of the microswitch 136 extending toward the plate 116 to be engaged thereby to close the switch 136 so long as the sealing arm 64 remains in following relation to the plate 116. However, if the sealing arm 64 engages the operator or another obstruction during the downward movement of the plate 116 and the arm 64, the arm 64 will separate from the plate 116 since the plate 116 will continue to pivot downwardly with the reciprocal withdrawing movement of the piston rod 130 and the microswitch 136 will thereby be opened. The microswitch 136 is connected in the electrical control circuitry (FIG. 7) of the L-sealing apparatus 10 in a manner hereinafter described to reverse the operation of the piston-and-cylinder assembly 126 and stop other operation of the apparatus 10 whenever the microswitch 136 opens.

As best seen in FIG. 1, a set of three microswitches 140,142,144 are mounted to the rear marginal flange portion 50' immediately beneath the pivoted side 64' of the sealing arm 64 and the arm 64 is provided correspondingly with three bolts 146,148,150 depending from the lower surface of the pivoted side 64' for depressing the exposed buttons of the microswitches 140,142,144 when the sealing arm 64 is in its downward position adjacent the frame 12. As hereinafter more fully explained, the microswitches 140,142,144 are respectively arranged in the electrical control circuitry for the L-sealing apparatus 10 to actuate the heating wires 78 and the three piston-and-cylinder assemblies 94 when the sealing arm 64 is lowered to its downward position adjacent frame 12 and to actuate the conveyor belt 58 upon the completion of each sealing cycle. For this purpose, the microswitches 140,142 are arranged to be normally open when their respective buttons are not depressed and to be closed when the buttons are depressed, while the microswitch 144 is arranged to be normally closed when its button is not depressed and to be opened when its button is depressed.

Figure 6:
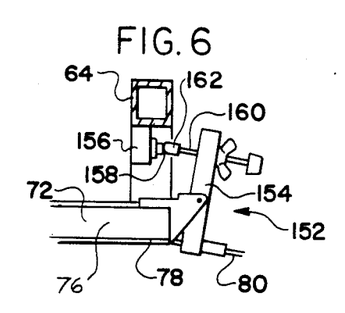
FIG. 6 is an enlarged elevational view of a microswitch arrangement for de-activating the heating arrangement of the sealing arm.

As will be understood, the heating wires 78 are adapted to expand and increase in length when they are heated, as a function of the temperature of the wire. During sealing operation, it is often necessary to maintain clamping pressure on thermoplastic sheeting or film being sealed for a period of time longer than that necessary to heat the wires to a desirable maximum temperature and, accordingly, it is important to control the maximum temperature to which the wires 78 are heated in order to insure achievement of optimum sealing. For this purpose, a microswitch and actuating arm assembly 152 is mounted at the outward end of the pivoted arm 64' in association with the wire 78 of the wire heating assembly 72 on the side 64" of the sealing arm 64 to be opened and closed by the wire 78 in relation to its temperature, all as will be best seen and understood with reference to FIG. 6. The assembly 152 includes an arm 154 pivotably affixed to the outward end of the wire heating assembly 72 with the wire 78 thereof attached to the lower end of the arm 154 to cause pivoting of the arm upon thermal expansion and contraction of the wire 78. A microswitch 156 is mounted to the sealing arm 64 with the operating button 158 of the microswitch 156 positioned adjacent the upper end of the pivot arm 154. The upper end of the pivot arm 154 threaded receives a bolt 160 oriented to project toward the microswitch button 158, the projecting end 162 of the bolt 160 having an enlarged contact head formed thereon. As the wire 78 to the wire heating assembly 72 is heated, its length will extend causing pivoting of the lower end of the arm 154 to move away from the wire heating assembly 72 and the contact head 162 of the bolt 160 at the upper end of the arm 154 to move toward and depress the microswitch button 158. The threaded mounting of the bolt 160 at the upper end of the arm 154 enables the projecting length of the bolt 160 to be selectively adjusted to predetermine the lengthwise expansion of the wire 78 and the corresponding degree of heating thereof necessary to effect closing of the microswitch 156. As hereinafter described, the microswitch 156 is arranged in the operating electrical control circuitry for the L-sealing apparatus 10 to shut-off operating electricity to the wires 78 upon closing of the microswitch 156.

Figure 8:
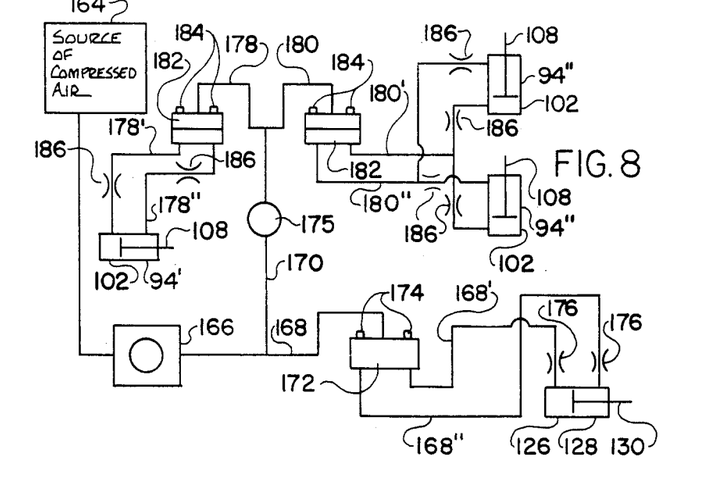
FIG. 8 is a schematic diagram of the air flow circuitry for the actuating piston-and-cylinder assembly for the sealing arm and the piston-and-cylinder assemblies for the sealing bed.

A schematic diagram of the air flow circuit of the L-sealing apparatus 10 for operating the piston-and-cylinder assemblies 94 and 126 is shown in FIG. 8. A source of compressed air 164 is provided for this purpose and is initially directed through a lubricating filter 166 of conventional construction adapted to filter debris from the compressed air as well as to inject thereinto a small amount of lubricant for the piston-and-cylinder assemblies 94,126. The compressed air flowing through the filter 166 is next directed through one branch line 168 to operate the piston-and-cylinder assembly 126 for controlling pivotal movement of the sealing arm 64 and through a second branch line 170 for operating the three piston-and-cylinder assemblies 94 of the sealing bed assembly 92. As previously indicated, the piston-and-cylinder assembly 126 is of the double-acting type, an electrical solenoid valve 172 being provided in the branch line 168 for controlling the flow of compressed air to be delivered either through a line 168' to the fitting 132 opening into the cylindrical housing 128 on the power side of the piston 130 to extend it to pivot the plate 116 and the sealing arm 164 toward their upwardly pivoted positions or through another line 168" connected to the fitting 134 opening into the cylindrical housing 128 on the other side of the piston 130 to withdraw the piston 130 to pivot the plate 116 and the sealing arm 164 toward their downward positions adjacent the frame 12. As will be understood, during any operation of the piston-and-cylinder assembly 126, the line 168' or 168" which is inactive for delivering compressed air to the cylindrical housing 128 functions to exhaust and deliver to the valve 172 air from the side of the piston 130 to which compressed air is not being supplied. The valve 172 includes flow regulating valves 174 adapted to restrict the rate of air exhaust and, additionally, each line 168',168" has a flow regulating valve 176 therein operative in the direction of compressed air flow, rather than air exhaust, for purposes of compatibly controlling the speed of reciprocal extension and withdrawal of the piston 130. The solenoid valve 172 has only two positions in order to always deliver compressed air to one or the other sides of the piston 130 of the piston-and-cylinder assembly 126.

Each of the three piston-and-cylinder assemblies 94 of the sealing bed assembly 92 are also of the double-acting type, as previously indicated. A regulating valve 175 is provided in the branch line 170 to restrict the compressed air pressure to a predetermined level. The line 170 communicates with two further branch lines 178,180 to deliver the regulated compressed air flow to the corner piston-and-cylinder assembly 94' through the branch line 178 and to the end piston-and-cylinder assemblies 94" through the branch line 180. As with the piston-and-cylinder assembly 126, a two-position electrical solenoid valve 182 is provided in each branch line 178,180 to control the flow of compressed air through lines 178',178" to the opposite ends of the piston-and-cylinder assembly 94' and through lines 180',180" to opposite ends of the piston-and-cylinder assemblies 94". Each solenoid valve 182 also includes exhaust flow regulating valves 184 and each of the lines 178',178" and lines 180',180" are provided with flow regulating valves 186 to control the speed of extension and withdrawal movement of the pistons 108 of the piston-and-cylinder assemblies 94.

Figure 7:
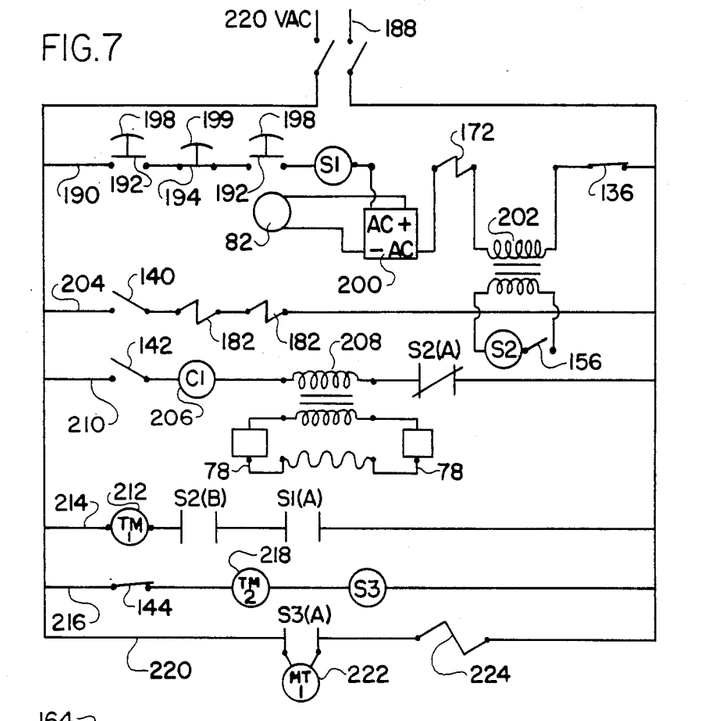
FIG. 7 is a schematic wiring diagram of the electrical control circuitry for the L-sealing apparatus of FIG. 1.

Referring now to FIG. 7, a schematic diagram of the electrical control circuitry for the L-sealing apparatus 10 is shown. Operating electrical power for the L-sealing apparatus 10 is supplied from a source of 220 volt alternating electrical current indicated at 188, across which are connected several operating circuits. In a first actuating circuit 190, a pair of manually-operated normally-open actuating switches 192 are connected in series with a manually-operated normally-closed deactuating switch 194 and with an actuating relay S1. Operating buttons 198,199 for the actuating switches 192,194, respectively, are located on the front marginal flange portion 48' of the frame 12 for easy operator access and actuation. The relay S1 is connected to a bridge rectifier 200 which is connected with the electromagnets 82 to deliver a direct current power supply thereto and is also connected with the solenoid valve 172 to deliver an alternating current power supply thereto. A transformer 202 and the microswitch 136 are connected in series with the solenoid valve 172 to complete the actuating circuit 190. Another relay S2 and the microswitch 156 are connected in series across the transformer 202.

The microswitch 140 and the two solenoid valves 182 are connected in series across the power supply 188 to form a second operating circuit 204 for operation of the piston-and-cylinder assemblies 94. The microswitch 142 is connected in series with a contactor 206, another transformer 208 connected to the seal wires 78, and normally-closed contacts S2(A) of the relay S2 to provide an operating circuit 210 for supplying operating electrical current to the heating wires 78. A timer 212 is connected in series with normally-open contacts S2(B) and S1(A) of the relays S1,S2, respectively, to provide a timing circuit 214 operable upon simultaneous energization of the relays S1,S2. In another circuit 216, the normally-closed microswitch 144 is connected in series with a second timer 218 and with another relay S3. The normally-open contacts S3(A) of the relay S3 are connected to the motor 222 to the conveyor belt 58 to form another operating circuit 220. Optionally, the apparatus 10 may be provided with a vacuum arrangement (not shown) in the vicinity of the front marginal flange portion 48' for sucking away and collecting scrap film severed in the sealing process. A solenoid valve 224 of operating the vacuum arrangement would accordingly be provided in the circuit 220 in series with the contacts S3(A).

In operation of the L-sealing apparatus 10, a roll (not shown) of appropriate center-folded heat-shrinkable thermoplastic film is placed on the rollers 36 for rotational off-winding of film from the roll. Of course, as those skilled in the art will readily recognize, any other heat-sealable thermoplastic sheeting may also be employed with the apparatus 10. The film roll is positioned on the rollers 36 with the center fold thereof toward the rear side of the frame 12 and the two folded webs of the film at the leading edge of the film roll are separated, with the lower web being passed beneath the panel 42 and the upper web being passed over the panel 42. The operator is thus enabled to easily insert an article to be packaged between the webs by merely lifting the upper web portion from the panel 42 and sliding the article onto the panel 42 beneath the upper web.

As above-explained, in the continuous operation of the apparatus 10, each sealing cycle will leave the leading end of the film with a transverse seal so that the film upon initiating each packaging cycle will already be joined transversely at the leading end thereof and along the center fold line. A suitable length of the film with the inserted article between the webs thereof is drawn manually by the operator toward and is placed on the conveyor belt 58 of the conveyor table 56 with the longitudinally-extending unjoined edges of the upper and lower webs of the film positioned on the front seal pad 96 and the trailing portion of the film positioned across the transverse seal pad 98.

The operator next depresses both of the operating buttons 198 to close the actuating switches 192. Notably, the operating buttons 198 are spaced from one another on opposite sides of the de-actuating button 199 to normally require the operator to use both hands to achieve simultaneous depression of the operating buttons 198 to best insure that the operator's arms are free of the downward path of the sealing arm 64 to best promote operator safety. Upon simultaneous closing of the switches 192, the relay S1 is energized. In turn, the electromagnets 82, the solenoid valve 172 and the transformer 202 are energized. The solenoid valve 172 normally maintains a position directing compressed air from the compressed air source 164 through the line 168' to the power side of the piston 130 of the piston-and-cylinder assembly 126 to maintain the piston 130 extended and the plate 116 and the sealing arm 64 pivotd to their upward positions. Upon energization of the solenoid valve 172, the valve position is changed to direct compressed air into the line 168" to cause the piston 130 to withdraw into the cylindrical housing 128 to pivot the plate 116 and the sealing arm 64 to their downward positions adjacent the frame 12.

In the event the sealing arm 64 encounters an obstruction during this downward pivotal movement, the sealing arm 64 will separate from the plate 116 causing the microswitch 136 to open and thereby break the actuating circuit 190 to prevent further operation of the L-sealer 10, whereupon the solenoid valve 172 would return to its normal position to effect return movement of the piston 130 to its normal extended position to return the plate 116 and the sealing arm 64 to their upwardly pivoted positions.

Assuming the downward movement of the sealing arm 64 is unobstructed, as the sealing arm 64 closes to its downward position adjacent the frame 12, the bolts 146,148, 150 on the pivoted side 64' of the arm 64 depress the exposed buttons of the microswitches 140, 142, 144 to close the microswitches 140,142 and to open the microswitch 144. The closing of the microswitch 142 completes the electrical circuit 210 to energize the contactor C1 and the transformer 208 to deliver operating electrical power to the sealing wires 78 to cause them to become heated. Similarly, the closing of the microswitch 140 completes the electrical circuit 204 to energize each solenoid valve 182 to deliver compressed air through the line 178',180' to the piston-and-cylinder assemblies 94 to cause them to extend their piston rods 108 and, in turn, to elevate the sealing bed assembly 92 in a translatory fashion to engage the sealing pads 96,98 of the sealing bed assembly 92 with the heating wires 78 and bed pads 76 of the wire heating assemblies 72,74 to apply clamping pressure therebetween to grip the thermoplastic film and begin the heat sealing and severing thereof.

Once the heating wires 78 have reached their desired predetermined maximum temperature, the resultant expansion of the wires 78 will cause the contact head 162 on the arm 154 of the microswitch arrangement 152 to contact the microswitch button 158 and close the microswitch 156, whereby the relay S2 is energized. Accordingly, the normally-closed contacts S2(A) of the relay S2 open and break the electrical circuit 210 to the heating wires 78 to prevent further electrical power thereto and heating thereof. Further, both relays S1 and S2 now being energized, their normally-open contacts S2(A) and S2(B) are closed to complete the circuit 214 to energize the timer 212 therein. The timer 212 is connected in the conventional internal holding circuit of the relay S1 so that, once the predetermined time period of the timer 212 has elapsed, the relay S1 is de-energized by the timer 212 and, in turn, the solenoid valve 172 is de-energized to return it to its original position to deliver compressed air to the power side of the piston 130 of the piston-and-cylinder assembly 126 to extend the piston 130 and pivot the plate 116 and sealing arm 64 upwardly. Upon upward pivoting of the sealing arm 64, each of the buttons to the microswitches 140,142, 144 are released to open the microswitches 140,142 and close the microswitch 144. Accordingly, the circuit 204 to the solenoid valves 182 is broken to de-energize the valves 182 and return them to their original position to deliver compressed air to their associated piston-and-cylinder assemblies 94 to withdraw the pistons 108 thereof to lowr the sealing bed assembly 92 to its original position. The closing of the microswitch 144 completes the electrical circuit 216 to energize the timer 218 and the relay S3 to close the normally-open contacts S3(A) of the relay S3 to complete the electrical circuit 220 and, in turn, energize the conveyor motor 222 and the solenoid valve 224. The conveyor belt 58 transports the thusly-completed and sealed package to the end of the apparatus frame 12 for subsequent passage through a shrink tunnel, while the energized solenoid valve 224 activates the aforementioned vacuum to withdraw and collect any scrap film severed in the sealing process. The timer 218 is connected in the internal holding circuit of the relay S3(A) so that, once the predetermined time period of the timer 218 has elapsed, the relay S3 is de-energized by the timer 218 and, in turn, the contacts S3(A) are opened to deactuate the conveyor motor 222 and the solenoid valve 224.

Figure 3:
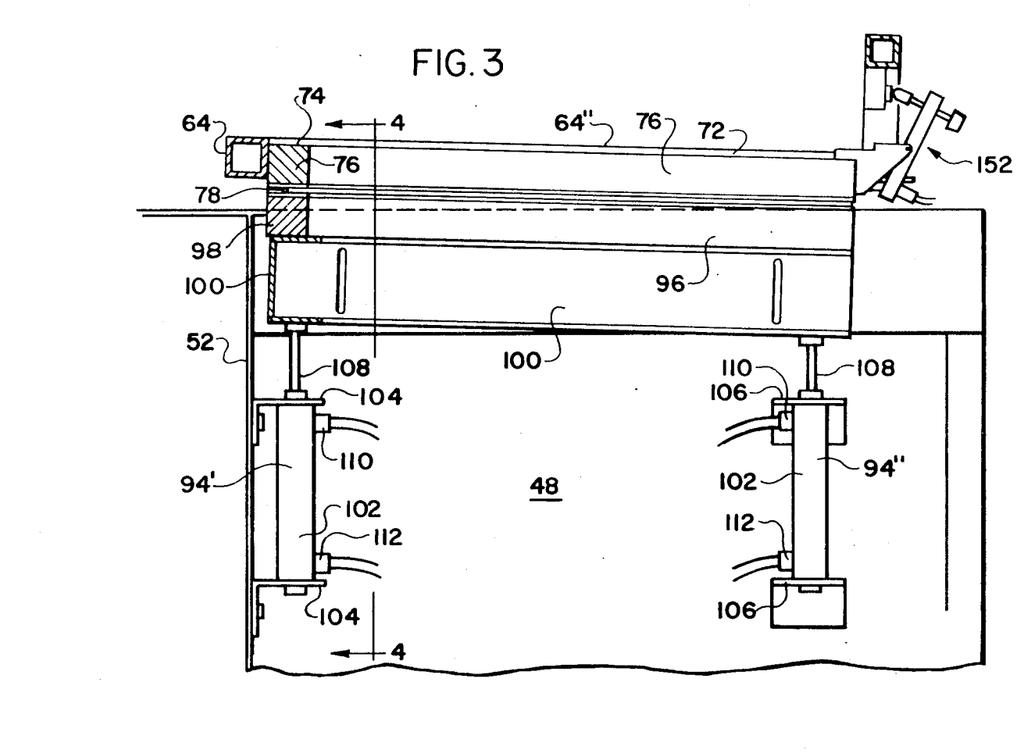
FIG. 3 is a vertical cross-sectional view of the L-sealing apparatus of FIG. 1 taken along line 3—3 of FIG. 2.
Figure 4:
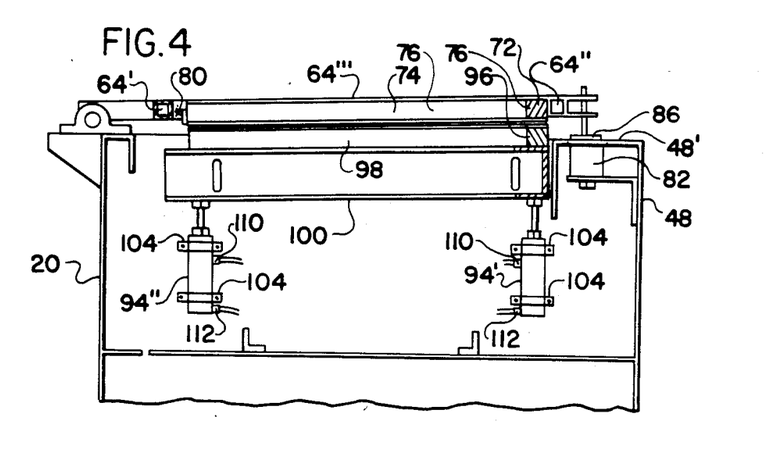
FIG. 4 is another vertical cross-sectional view of the L-sealing apparatus of FIG. 1 taken along line 4—4 of FIG. 3.

With reference to FIGS. 3 and 4, the described mounting of the sealing bed assembly 92 on the three piston cylinder assemblies 94 will be understood to provide automatic compensating adjustment of the orientation of the seal pads 96,98 of the sealing bed assembly 92 with respect to the bed pads 76 of the wire heating assembly 72,74 even when the bed pads 76 are out of proper alignment. For example, in FIGS. 3 and 4, the bed pads 76 of the wire heating assemblies 72,74 are shown to be substantially out of proper horizontal alignment with the juxtaposed ends of the bed pads 76 forming the corner of the L-shape of the wire heating assemblies 72, 74 being substantially higher in the magnetically latched disposition of the sealing arm 64 than are the outward ends of the bed pads 76. This condition would occur, for example, if the armature disks 86 and armature shafts 88 are substantially out of proper adjustment or if the pivot support bearings 70 for the pivoted side 64' of the sealing arm 64 are out of adjustment, although a number of other reasons may also cause this misalignment. It should also be understood that the illustrated misalignment of the wire heating assemblies 72,74 is significantly exaggerated in FIGS. 3 and 4 for purposes of illustration and explanation of the present invention it being highly unusual for the wire heating assemblies 72,74 to be so out of alignment in actual use of the apparatus 10.

The electromagnets 82 are of a selected power to exert a gripping force on the sealing arm 64 substantially in excess of the maximum force which may be generated by the extending pistons 108 of the piston-and-cylinder assemblies 94 under the effect of the regulated air pressure so that the sealing arm 64 is maintained substantially rigid and fixed with respect to any translatory movement of the sealing bed assembly 92. When the piston-and-cylinder assemblies 94 are actuated, each piston rod 108 extends until the respectively associated portion of the seal pads 96,98 encounters the portion of the bed pads 76 of the wire heating assembly 72,74 immediately thereabove. Thus, in FIGS. 3 and 4, it will be readily recognized that the piston rod 108 of the corner piston-and-cylinder assembly 94' is substantially more extended than the piston rod 108 of the end piston-and-cylinder assemIblies 94". Accordingly, the sealing bed assembly 92 is adapted to assume automatically the same orientation as the bed pads 76 of the wire heating assemblies 72,74 by the automatically varied extension of the piston rods 108 to the height necessary to engage the seal pads 96,98 with the bed pads 76, whether the wire heating assemblies 72,74 are in exactly proper alignment or are grossly out of alignment with the sealing bed assembly 92. In this manner, substantially continuous and uniform sealing contact and pressure is achieved between the seal pads 96,98 and the bed pads 76 during every sealing cycle of the apparatus 10 substantially without ever requiring adjustment of the wire heating assemblies 72,74 and the sealing bed assembly 92 other than the initial factory adjustment thereof, unless of course unusual circumstances cause the wire heating and sealing bed assemblies to become grossly out of alignment.

Figure 9:
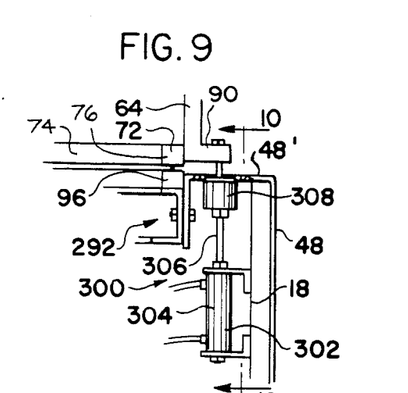
FIG. 9 is a partial end elevational view of another L-sealing apparatus according to a second preferred embodiment of the present invention.
Figure 10:
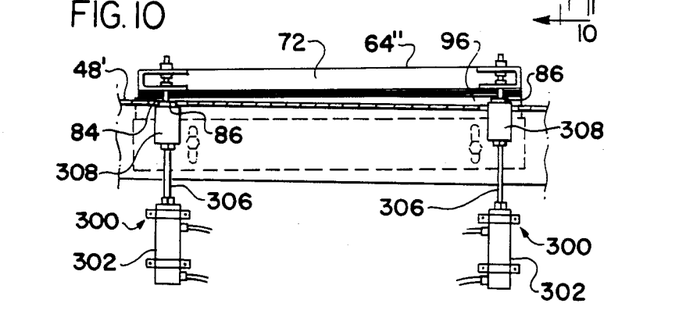
FIG. 10 is a vertical cross-sectional view of the L-sealing apparatus of FIG. 9, taken along line 10—10 thereof.

With reference to FIGS. 9 and 10, a second embodiment of the present invention is illustrated. The L-sealing apparatus in this embodiment is of substantially the same construction as the apparatus 10 of FIGS. 1-8 as described above, (like reference numerals being utilized for corresponding components), except that the sealing bed assembly 292 does not include supporting piston-and-cylinder assemblies 94 but instead is fixedly bolted directly to the front marginal flange portion 48' and the end wall panel 52 of the frame 12 in conventional fashion and except further that a pair of pneumatic-electromagnetic latch assemblies 280 are utilized to exert sealing pressure on the sealing arm 64 against the sealing bed assembly 292. The pneumatic-electromagnetic latch assemblies 300 are generally of the same construction as the latch assemblies described in U.S. Pat. No. 4,447,284. Each latch assembly 300 essentially includes a piston-and-cylinder assembly 302 mounted by the cylindrical housing 304 thereof to the interior surface of the front wall panel 48 of the cabinet section 16 of the frame 12 immediately beneath the front marginal flange portion 48' at the location of the electromagnets 82 in FIGS. 1-4, with the piston rods 306 of the piston-and-cylinder assemblies 302 extending vertically upwardly and having electromagnets 308 fixed to the extending ends of the piston rods 306.

The operation of the L-sealing apparatus of FIGS. 9 and 10 is carried out in substantially the same manner as in the apparatus 10 of the embodiment of FIGS. 1-8, except that, upon downward pivoting of the sealing arm 64 into its position adjacent the frame 12 and resulting magnetic latching engagement of the electromagnets 308 with the armature disks 86 and closing of the microswitches 140,142,144, operating compressed air is delivered to the top ends of the cylindrical housings 304 of the piston-and-cylinder assemblies 302 above the pistons 306 to withdraw the piston rods 306 into the cylinder housings 304 to draw the sealing arm 64 downwardly from each end thereof. As seen in FIG. 10, the downward movement of the sealing arm 64 at each end thereof, automatically compensates to orient the wire heating assemblies 72,74 into parallel alignment with the sealing bed assembly 292 even when the sealing bed assembly 292 is out of alignment. The rectangular configuration of the sealing arm 64 without any cross-bracing will be understood to permit a reasonable degree of resilient torsional distortion of the sealing arm 64. Thus, as in the operation of the apparatus of FIGS. 1-8, the piston-and-cylinder assemblies 302 will continue to withdraw their respective pistons 306 until the associated portions of the bed pads 76 of the wire heating assemblies 72,74 engage the adjacent portions of the seal pads 96,98 of the sealing bed assembly 292 immediately therebelow. In this manner, if the sealing bed assembly 292 is misaligned with respect to the sealing arm 64 and its wire heating assemblies 72,74 as shown in FIG. 10, the piston-and-cylinder assemblies 302 will torsionally distort the sealing arm 64 sufficiently to adaptively orient the bed pads 76 of the wire heating assemblies 72,74 into the same alignment as the seal pads 96,98 of the sealing bed assembly 292 to achieve uniform surface contact and pressure therebetween.

In significant contrast to prior art L-sealing apparatus, the apparatus of each embodiment of the present invention uniquely provides in combination the basic advantages of reliable operation for performing uniform sealing while substantially eliminating the need for adjustment of the present apparatus. With prior art L-sealing apparatus, reliable operation of the equipment, if uniform sealing can be achieved at all, is obtainable only at the expense of regular adjustment of the alignment of the sealing arm and sealing bed assemblies. Such adjustments require the services of skilled and experienced service personnel and even then are tedious, time-consuming and accordingly expensive, both in terms of service and maintenance costs and reduced production due to machine down time. With either embodiment of the present apparatus, only an initial factory adjustment of the alignment of the sealing arm, its wire heating assemblies, and the sealing bed assembly, should be necessary under normal conditions of opertion, any misalignment occurring over time and use of the apparatus being automatically compensated for by the unique features of the present apparatus above-described. Accordingly, more consistently uniform and economical production from film-wrapping operations will be readily achieved with the present invention.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

We claim:

1. Apparatus for heat sealing thermoplastic sheeting comprising a frame, a clamping jaw having a clamping surface, means mounting said clamping jaw on said frame, a heating jaw having heating means, means mounting said heating jaw on said frame for movement between a disposition spaced-apart from said clamping jaw and a disposition adjacent said clamping jaw for gripping and heat sealing thermoplastic sheeting between said clamping surface and said heating means, means for latching said heating jaw to be substantially fixed in its said adjacent disposition, means for actuating movement of said heating jaw between its said spaced-apart and adjacent dispositions, said actuating means being movably mounted on said frame in generally unattached engagement with said heating jaw for movement of said heating jaw in following relation to movement of said actuating means, and means for automatically deactuating said actuating means when said heating jaw encounters an obstruction during movement into engagement with said clamping jaw, said deactuating means including switch means between said actuating means and said heating jaw to be closed while said heating jaw is in following relation with said actuating means for permitting operation thereof and to open when said heating jaw is separated from said actuating means to stop operation thereof.

2. Apparatus for heat sealing thermoplastic sheeting comprising a frame, a clamping jaw having a clamping surface, means mounting said clamping jaw on said frame, a heating jaw having heating means, means mounting said heating jaw on said frame for movement between a disposition spaced-apart from said clamping jaw and a disposition adjacent said clamping jaw for gripping and heat sealing thermoplastic sheeting between said clamping surface and said heating means, means for latching said heating jaw to be substantially fixed in its said adjacent disposition, said clamping jaw mounting means including means for biasing said clamping jaw at plural spaced locations thereon for translatory movement toward said heating jaw in its said adjacent disposition automatically to orient and to engage said clamping surface in substantially continuous and uniform surface contact with said heating means for uniformly applying said heating means to thermoplastic sheeting gripped between said jaws, said biasing means including a plurality of linear actuators mounted on said frame, each said linear actuator comprising a piston and cylinder assembly having a reciprocable piston adapted to be operated by pressurized fluid, said clamping jaw being mounted at its said spaced locations respectfully on said reciprocable pistons of said linear actuators, said biasing means including a source of pressurized fluid, conduit means for supplying said pressurized fluid to said piston and cylinder assemblies, and means in said conduit means for regulating said pressurized fluid at a predetermined uniform pressure value.

3. Apparatus for heat sealing thermoplastic sheeting according to claim 2 and characterized further in that said latching means comprises electromagnet means mounted on said frame and armature means on said heating jaw for magnetic latching contact with said electromagnet means in said adjacent disposition of said heating jaw.

4. Apparatus for heat sealing thermoplastic sheeting according to claim 2 and characterized further by means for actuating movement of said heating jaw between its said spaced-apart and adjacent dispositions, said actuating means being movably mounted on said frame in generally unattached engagement with said heating jaw for movement of said heating jaw in following relation to movement of said actuating means, and means for automatically deactuating said actuating means when said heating jaw encounters an obstruction during movement into engagement with said clamping jaw, said deactuating means including switch means between said actuating means and said heating jaw to be closed while said one jaw is in following relation with said actuating means for permitting operation thereof and to open when said heating jaw is separated from said actuating means to stop operation thereof.

5. Apparatus for heat sealing thermoplastic sheeting according to claim 2 and characterized further in that said linear actuators are arranged to exert generally the same biasing force on said clamping jaw at each said spaced location for exerting uniform sealing pressure against said heating jaw.

6. Apparatus for heat sealing thermoplastic sheeting according to claim 2 and characterized further in that each of said clamping surface and said heating means is generally L-shaped, one said linear actuator being affixed to said clamping jaw at each end and the corner of said clamping surface for movement thereof into parallelism with said heating means.

7. Apparatus for heat sealing thermoplastic sheeting according to claim 6 and characterized further in that said latching means comprises electromagnet means mounted on said frame and armature means on said heating jaw for magnetic latching contact with said electromagnet means in said adjacent disposition of said heating jaw.

8. Apparatus for heat sealing thermoplastic sheeting according to claim 7 and characterized further by means for actuating movement of said heating jaw between its said spaced-apart and adjacent dispositions, said actuating means being movably mounted on said frame in generally unattached engagement with said heating jaw for movement of said heating jaw in following relation to movement of said actuating means, and means for automatically deactuating said actuating means when said heating jaw encounters an obstruction during movement into engagement with said clamping jaw, said deactuating means including switch means between said actuating means and said heating jaw to be closed while said one jaw is in following relation with said actuating means for permitting operation thereof and to open when said heating jaw is separated from said actuating means to stop operation thereof.

9. Apparatus for heat sealing thermoplastic sheeting comprising a frame, a clamping jaw having a clamping surface, means mounting said clamping jaw on said frame, a heating jaw having heating means, means mounting said heating jaw on said frame for movement between a disposition spaced-apart from said clamping jaw and a disposition adjacent said clamping jaw for gripping and heat sealing thermoplastic sheeting between said clamping surface and said heating means, means for engaging said heating jaw at spaced locations thereon in its adjacent disposition and moving said heating jaw toward said clamping jaw for translatory movement automatically to orient and to engage said heating means in substantially continuous and uniform surface contact with said clamping surface for uniformly applying said heating means to thermoplastic sheeting gripped between said jaws, said heating jaw being resiliently deformable by manipulation at said spaced locations and said engaging and moving means being adapted for deforming said heating jaw to such extent necessary to obtain substantially continuous and uniform surface contact between said heating means and said clamping surface, said engaging and moving means including a plurality of linear actuators, each said linear actuator comprising a piston and cylinder assembly having a reciprocable piston adapted to be operated by pressurized fluid, said linear actuators being mounted on said frame for latching engagement of their said reciprocable pistons with said heating jaw in its said adjacent disposition respectively at its said spaced locations for moving said heating jaw toward said clamping jaw, said engaging and moving means including a source of pressurized fluid, conduit means for supplying said pressurized fluid to said piston and cylinder assemblies, and means in said conduit means for regulating said pressurized fluid at a predetermined uniform pressure value.

10. Apparatus for heat sealing thermoplastic sheeting according to claim 9 and characterized further by means for actuating movement of said heating jaw between its said spaced-apart and adjacent dispositions, said actuating means being movably mounted on said frame in generally unattached engagement with said heating jaw for movement of said heating jaw in following relation to movement of said actuating means, and means for automatically deactuating said actuating means when said heating jaw encounters an obstruction during movement into engagement with said clamping jaw, said deactuating means including switch means between said actuating means and said heating jaw to be closed while said one jaw is in following relation with said actuating means for permitting operation thereof and to open when said heating jaw is separated from said actuating means to stop operation thereof.

11. Apparatus for heat sealing thermoplastic sheeting according to claim 9 and characterized further in that said linear actuators are arranged to exert generally the same force on said heating jaw at each said spaced location for exerting uniform sealing pressure against said clamping jaw.

12. Apparatus for heat sealing thermoplastic sheeting according to claim 9 and characterized further in that each of said clamping surface and said heating means is generally L-shaped, said engaging and moving means being arranged to engage said heating jaw in its said adjacent disposition at opposite ends of one linear extent of the L-shape of said heating means for resiliently deforming said heating jaw to move its said heating means into parallelism with said clamping surface.

13. Apparatus for heat sealing thermoplastic sheeting according to claim 12 and characterized further in that said heating jaw is generally rectangular in shape and is pivotally affixed to said frame along one rectangular side of said heating jaw, said heating means extending along the opposite rectangular side and one adjacent side of said heating jaw, said engaging and moving means being arranged to engage the opposite ends of said opposite side of said heating jaw in its said adjacent disposition to resliently deform the rectangular shape of said heating jaw to align said heating means at said opposite and adjacent sides of said heating jaw in parallelism with the corresponding L-shaped extent of said clamping surface.

14. Apparatus for heat sealing thermoplastic sheeting according to claim 13 and characterized further in that said engaging and moving means includes means for latching said reciprocable members of said linear actuators with said heating jaw in its said adjacent disposition, said latching means including electromagnet means mounted on said reciprocable member of each said linear actuator and armature means on said heating jaw at said opposite ends of its said opposite side for magnetic latching contact with said electromagnet means in said adjacent disposition of said heating jaw.

15. Apparatus for heat sealing thermoplastic sheeting according to claim 14 and characterized further by means for actuating movement of said heating jaw between its said spaced-apart and adjacent dispositions, said actuating means being movably mounted on said frame in generally unattached engagement with said heating jaw for movement of said heating jaw in following relation to movement of said actuating means, and means for automatically deactuating said actuating means when said heating jaw encounters an obstruction during movement into engagement with said clamping jaw, said deactuating means including switch means between said actuating means and said heating jaw to be closed while said one jaw is in following relation with said actuating means for permitting operation thereof and to open when said heating jaw is separated from said actuating means to stop operation thereof.

16. An L-sealing apparatus for heat sealing folded thermoplastic film along an L-shaped seal line comprising a frame having a sealing table surface, a clamping jaw having an L-shaped sealing bed surface, means mounting said clamping jaw on said frame with said sealing bed surface generally adjacent said sealing table surface, a heating jaw having L-shaped heating means thereon, means pivotably mounting said heating jaw on said frame for pivotal movement between a disposition spaced-apart from said clamping jaw for permitting placement of thermoplastic film to be heat sealed on said table surface and said sealing bed surface and a disposition adjacent said clamping jaw with said heating means in facing relation with said sealing bed surface for gripping and heat sealing thermoplastic film therebetween, and means for latching said heating jaw to be substantially fixed in its said adjacent disposition, said clamping jaw mounting means including means for biasing said clamping jaw at the locations of each of the ends and the corner of said L-shaped sealing bed surface for translatory movement toward said heating jaw in its adjacent disposition automatically to orient and to engage said sealing bed surface in parallelism and substantially continuous and uniform surface contact with said heating means along substantially their entire L-shaped extent for uniformly applying said heating means to thermoplastic film gripped between said jaws, said biasing means including a plurality of linear actuators mounted on said frame and arranged to exert generally the same biasing force on said clamping jaw at each said end and corner location for exerting uniform sealing pressure against said heating jaw, each said linear actuator comprising a piston and cylinder assembly having a reciprocable piston adapted to be operated by pressurized fluid, said clamping jaw being mounted at its said end and corner locations respectively on said reciprocable pistons of said linear actuators, said biasing means including a source of pressurized fluid, conduit means for supplying said pressurized fluid to said piston and cylinder assemblies, and means in said conduit means for regulating said pressurized fluid at a predetermined uniform pressure value.

17. An L-sealing apparatus according to claim 16 and characterized further by means for actuating movement of said heating jaw between its said spaced-part and adjacent dispositions, said actuating means being movably mounted on said frame in generally unattached engagement with said heating jaw for movement of said heating jaw in following relation to movement of said actuating means, and means for automatically deactuating said actuating means when said heating jaw encounters an obstruction during movement into engagement with said clamping jaw, said deactuating means including switch means between said actuating means and said heating jaw to be closed while said one jaw is in following relation with said actuating means for permitting operation thereof and to open when said heating jaw is separated from said actuating means to stop operation thereof.

18. An L-sealing apparatus according to claim 16 and characterized further in that said latching means comprises electromagnet means mounted on said frame and armature means said heating jaw for magnetic latching contact with said electromagnet means in said adjacent disposition of said heating jaw.

19. An L-sealing apparatus according to claim 18 and characterized further by means for actuating movement of said heating jaw between its said spaced-apart and adjacent dispositions, said actuating means being movably mounted on said frame in generally unattached engagement with said heating jaw for movement of said heating jaw in following relation to movement of said actuating means, and means for automatically deactuating said actuating means when said heating jaw encounters an obstruction during movement into engagement with said clamping jaw, said deactuating means including switch means between said actuating means and said heating jaw to be closed while said one jaw is in following relation with said actuating means for permitting operation thereof and to open when said heating jaw is separated from said actuating means to stop operation thereof.

20. Apparatus for heat sealing thermoplastic sheeting comprising a frame, a clamping jaw, a heating jaw, said jaws being mounted on said frame with one said jaw moveable into and out of closed engagement with the other said jaw for gripping and heat sealing thermoplastic sheeting therebetween, means for actuating movement of said one jaw, said actuating means being moveably mounted on said frame in generally unattached engagement with said one jaw for movement of said one jaw in following relation to movement of said actuating means, and means for automatically deactuating said actuating means when said one jaw encounters an obstruction during movement into engagement with said other jaw, said deactuating means including switch means between said actuating means and said one jaw to be closed while said one jaw is in following relation with said actuating means for permitting jaw-closing operation thereof and to open when said one jaw is separated from said actuating means to stop jaw-closing operation thereof.

21. Apparatus for heat sealing thermoplastic sheeting according to claim 20 and characterized further by means for driving movement of said actuating means, said switch means being operatively associated with said driving means for permitting jaw-closing operation thereof while said switch means is closed and for stopping and reversing jaw-closing operation thereof when said switch means is opened.

22. Apparatus for heat sealing thermoplastic sheeting according to claim 21 and characterized further in that said heating jaw is said one jaw and is pivotably mounted on said frame for pivotal movement between an upward disposition spaced-apart from said clamping jaw and a downward disposition adjacent said clamping jaw for heat sealing engagement therewith, said actuating means comprising plate means pivotably mounted on said frame to extend beneath said heating jaw to support said jaw restingly thereon for pivotal movement of said heating jaw in following relation to pivotal movement of said plate means, said switch means being mounted on one of said plate means and said heating jaw for switch-closing engagement by the other thereof while said heating jaw is in following relation with said plate means and for opening of said switch means when said heating jaw and said plate means are separated from one another.

23. Apparatus for heat sealing thermoplastic sheeting according to claim 20 and characterized further in that said heating jaw is said one jaw and is pivotably mounted on said frame for pivotal movement between an upward disposition spaced-apart from said clamping jaw and a downward disposition adjacent said clamping jaw for heat sealing engagement therewith, said actuating means comprising plate means pivotably mounted on said frame to extend beneath said heating jaw to support said jaw restingly thereon for pivotal movement of said heating jaw in following relation to pivotal movement of said plate means, said switch means being mounted on one of said plate means and said heating jaw for switch-closing engagement by the other thereof while said heating jaw is in following relation with said plate means and for opening of said switch means when said heating jaw and said plate means are separated from one another.

* * * * *

UNITED STATES PATENT OFFICE
CERTIFICATE OF CORRECTION

Patent No. 4,650,535     Dated March 17, 1987

Inventor(s) Charles J. Bennett and Terry F. Hinson

It is certified that error appears in the above-identified patent and that said Letters Patent are hereby corrected as shown below:

Col. 3, Line 30, delete "of", first occurrence thereof, and insert therefor — and — .
Col. 7, Line 7, delete "clyindrical" and insert therefor — cylindrical — .
Col. 11, Line 4, delete "of" and insert therefor — for — .
Col. 11, Lines 54-55, delete "pivotd" (hyphenated) and insert therefor — pivoted — .
Col. 12, Line 16, delete "line" and insert therefor — lines — .
Col. 12, Line 36, delete "S2(A)" and insert therefor — S1(A) — .
Col. 12, Line 54, delete "lowr" and insert therefor — lower — .
Col. 13, Line 47, delete "assemblIes" and insert therefor — assemblies — .
Col. 14, Lines 33-34, delete "cylinder" (hyphenated) and insert therefor — cylindrical — .
Col. 15, Line 9, delete "opertion" and insert therefor — operation — .
Col. 19, Line 37, delete "spaced-part" and insert therefor — spaced apart — .

Signed and Sealed this

Second Day of February, 1988

*Attest:*

DONALD J. QUIGG

*Attesting Officer*     *Commissioner of Patents and Trademarks*